P. MALVEZIN.
PROCESS AND APPARATUS FOR ROASTING COFFEE AND OTHER SUBSTANCES.
APPLICATION FILED JUNE 12, 1915.
1,237,931. Patented Aug. 21, 1917.
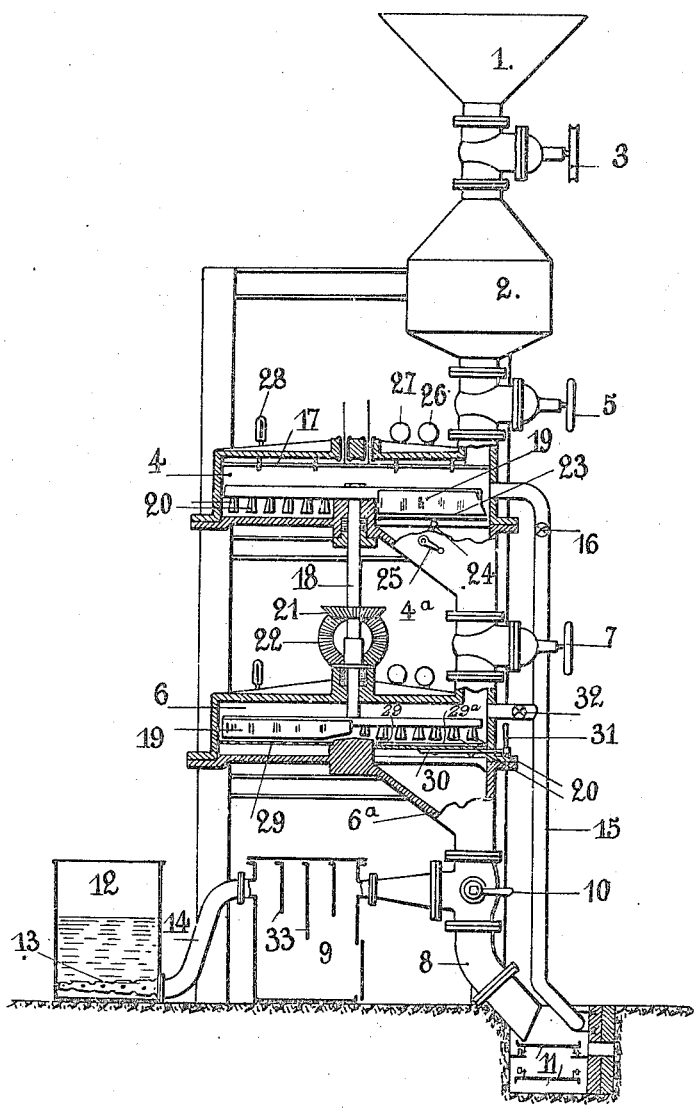
WITNESSES
INVENTOR
Pierre Malvezin
BY
ATTORNEYS

UNITED STATES PATENT OFFICE.

PIERRE MALVEZIN, OF SCEAUX, FRANCE.

PROCESS AND APPARATUS FOR ROASTING COFFEE AND OTHER SUBSTANCES.

1,237,931.

Specification of Letters Patent.

Patented Aug. 21, 1917.

Application filed June 12, 1915. Serial No. 33,763.

*To all whom it may concern:*

Be it known that I, PIERRE MALVEZIN, a citizen of the French Republic, and residing in Sceaux, (Seine), France, 7 Rue Quesney, engineer, have invented certain new and useful Improvements in and Relating to Processes and Apparatus for Roasting Coffee and other Substances, of which the following is a complete specification.

This invention has for its object to provide an improved process and apparatus for roasting coffee and other substances.

The improved process consists in effecting the roasting operation in a container which is heated by any suitable means and in which either previously or at any moment of the roasting operation, air or any other innocuous gas has been compressed to a pressure sufficient to prevent the constituent elements of the substances under treatment from becoming vaporized at the temperature that is employed.

The accompanying drawing illustrates by way of example in vertical section a constructional form of an apparatus for carrying the improved roasting process into effect, as applied to coffee.

As shown, the improved apparatus comprises a charging hopper 1; a receiver 2 capable of communicating with the hopper by means of a sluice valve 3; a roasting chamber 4 capable of communicating with the receiver 2 by means of a sluice valve 5; a cooling chamber 6 capable of communicating with the roasting chamber by means of a sluice valve 7; a discharging pipe 8 and a box 9 that can be placed alternately in communication with the cooling chamber by means of a three-way cock 10; an endless conveyer 11 for receiving the materials falling through the pipe 8; a tank 12 containing water in the bottom of which is a perforated pipe 13 communicating by means of a pipe 14 with the box 9, and a pipe 15 which communicates with a supply of compressed air and which by means of cocks 16 and 32, allow of passing compressed air into the roasting chamber 4 and the cooling chamber 6.

The charging hopper 1 having been filled with, for instance, raw coffee, the valve 3 is opened, the valve 5 being kept shut; the coffee will run down into and fill the receiver 2. The valve 3 is then closed, and the valve 5 opened, so that all the coffee contained in the receiver 2 will fall into the roasting chamber 4. The latter which is of circular shape and of comparatively small height, contains in its upper part an arrangement of electric heaters, only one element 17 of which is shown.

The current is supplied to these heaters by means of a device that allows of varying their intensity, and consequently of regulating the temperature inside the roasting chamber 4.

Through the central part of the lower plate or bottom of the roasting chamber 4, there extends, guided in a packing box, a vertical shaft 18 provided with two horizontal arms, one of which carries an inclined rake or scraper 19, and the other a series of shares 20. On that part of the shaft 18 situated below the roasting chamber, there is fixed a level pinion 21 gearing with a driving wheel 22. As they revolve, the rake and the shares stir up the coffee in the roasting chamber.

The bottom of the roasting chamber 4 comprises an inclined portion formed as a hopper or spout 4ᵃ above the valve 7. The upper orifice of this spout is closed during the roasting operation by a trap door 23 which can be lowered by means of a lever 24 with antifriction roller, actuated from the outside by means of a handle 25.

The top of the roasting chamber is fitted with a pressure gage 26, a thermometer 27, and a safety valve 28.

At each operation air is admitted into the roasting chamber, at a pressure such that when it is heated to a temperature of about 175 degrees centigrade, it will have attained a pressure of about 15 atmospheres. Then, the coffee is charged into the roasting chamber as hereinbefore described. The electric current is turned on so as to raise the temperature to 175 degrees C., and the coffee is stirred by rotating the rake 19 and the shares 20 so as to assure its becoming uniformly roasted.

The pressure produced in the roasting chamber is higher than the maximum tensions of any vapors that can possibly be generated by the constituent principles of the coffee when heated to a temperature of 175 degrees C., so that none of the said constituent principles can be volatilized. The result is a very great improvement in the yield and the quality of the coffee, since the latter thus retains all its constituent principles.

When the roasting operation is completed, the valve 7 is opened to place the roasting chamber into communication with the cooling chamber 6.

This chamber 6 is somewhat similar to the roasting chamber, except that it has no radiator; that the shaft 18 enters it from the top; and that it has a double bottom 29 formed by a perforated metal plate upon which the roasted coffee is stirred.

The bottom of this cooling chamber has also an inclined part formed as a hopper 6ª. The perforated plate 29 has a radial opening 29ª situated over this hopper, which can be shut by means of a register 30 operated from the outside by means of a handle 31.

The same pressure as in the roasting chamber has been previously established in the cooling chamber by opening the cock 32. Therefore when the coffee discharged from the roasting chamber passes into the cooling chamber it will be under the same pressure while it is being well stirred. The temperature drops quickly, and after a few moments, the cock 10 is opened gradually to establish communication with the box 9. The pressure then falls rapidly, and the expansion of the air produces a considerable and rapid drop in temperature.

It is, however, to be understood that during this entire cooling operation, the temperature drops more quickly than the pressure, so that at no time can the volatile constituents of the coffee volatilize.

The expansion of the air causes all the skins of the coffee beans to run together. The said skins are arrested by baffles 33 arranged in the box 9 and accumulate in the bottom part of this box while the air that escapes through the pipes 14, 13, bubbles up through the water in the tank 12.

When the interior of the cooling chamber has the same pressure as that obtaining outside the same, the cock 10 is operated to place the cooling chamber in communication with the outlet pipe 8. The handle 31 is actuated so as to allow the coffee to fall on to the conveyer 11 which conveys it for instance to a warehouse for storing or packing.

The receiver, the roasting chamber and the cooling chamber operate all at the same time and under the same pressure, so that the roasting process is practically continuous.

The improved apparatus may also be employed for roasting cocoa beans, etc.

What I claim is:—

1. A process for roasting coffee, which consists in subjecting the coffee to a heating and to a cooling operation and keeping the coffee during the heating and cooling operation in an atmosphere of compressed air or other innocuous gas under a pressure that is higher than the maximum tension of the vapors that can be given off by the said coffee at its roasting temperature.

2. An apparatus for roasting coffee and other substances, comprising vessels of suitable strength and resistance, adapted to be placed separately in communication with a supply of compressed air and containing suitable stirring devices, one of said vessels, that is situated above the other, being provided with heating means and being adapted to be placed in communication by means of a trap door and a sluice valve with the lower vessel that serves to cool the roasted substance.

3. A process for the roasting of coffee and other substances consisting in subjecting the substance to heat in a compressed atmosphere innocuous to the substance, and under pressure above the vapor tension of the constituents of the substance caused by the heat, stirring the substance while it is so heated, and then cooling the substance while it is stirred by a rapid reduction of temperature and pressure at a rate such that the pressure is always above the vapor tension of the constituents of the substance caused by the heat.

4. A process for the roasting of coffee, consisting in subjecting the coffee to heat at a temperature of substantially 175° in an inoffensive atmosphere which is under a pressure of about 15 atmospheres, stirring the coffee while it is so heated, then cooling the coffee while it is stirred and reducing the pressure at a rate such that the pressure is always above the vapor tension of the constituents of the coffee caused by the heat during its reduction.

5. An apparatus for roasting coffee and other substances, comprising a roasting chamber, a cooling chamber, means for supplying air under pressure independently to said chambers, stirring means associated with said chambers, and means for reducing the pressure in the cooling chamber at a rate such that the pressure is always above the vapor tension of the constituents of the substances caused by the reduction of heat.

In testimony whereof I have hereunto set my hand at Paris, (France), this 25th day of May 1915.

PIERRE MALVEZIN.